Dec. 30, 1941.  M. HAGGETT  2,268,450
CARRYING CASE FOR PROJECTORS AND PROJECTION SCREENS
Filed Sept. 14, 1939  2 Sheets-Sheet 1
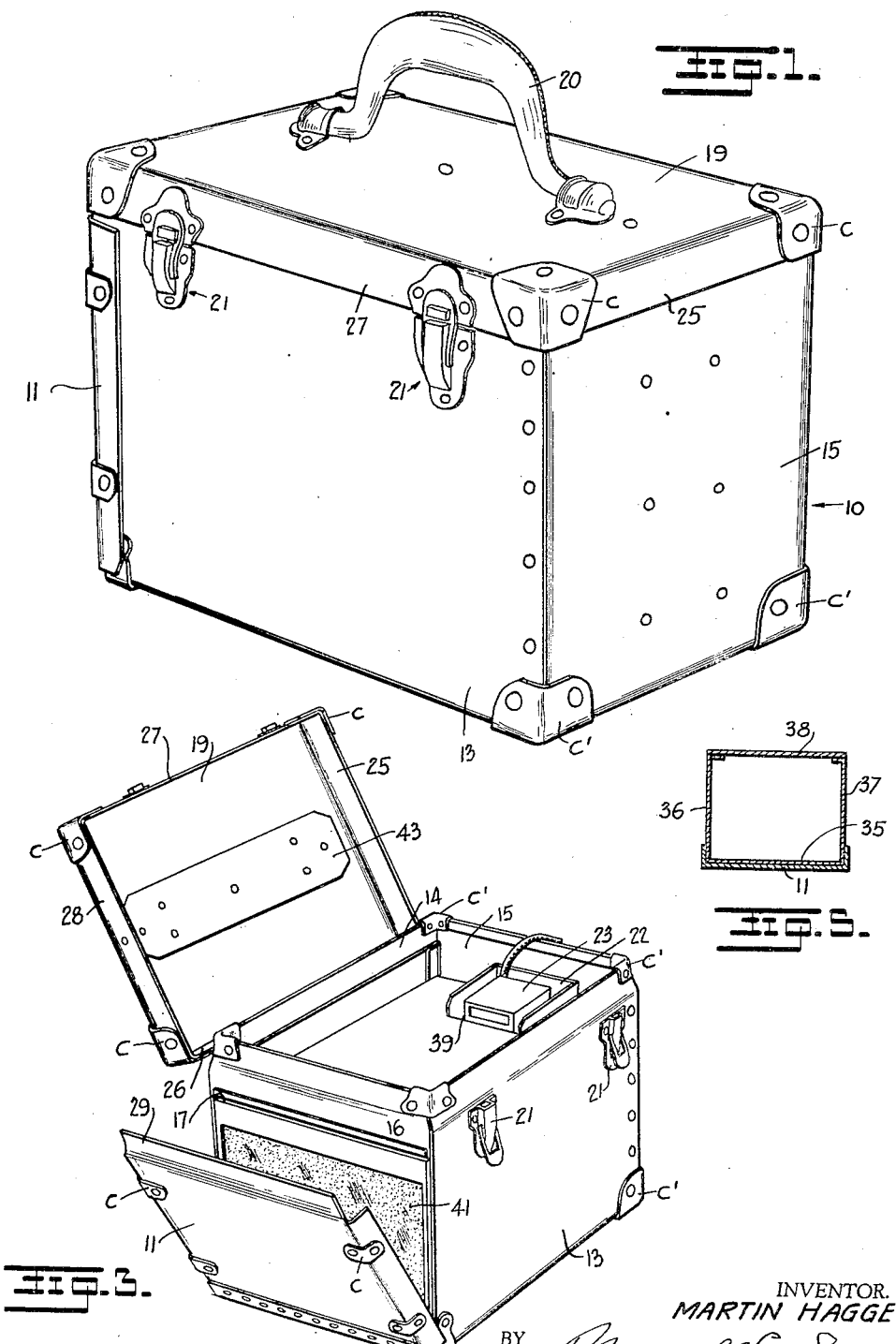
INVENTOR.
MARTIN HAGGETT.
BY Maxwell E. Sparrow
ATTORNEY.

Dec. 30, 1941.     M. HAGGETT     2,268,450
CARRYING CASE FOR PROJECTORS AND PROJECTION SCREENS
Filed Sept. 14, 1939     2 Sheets-Sheet 2
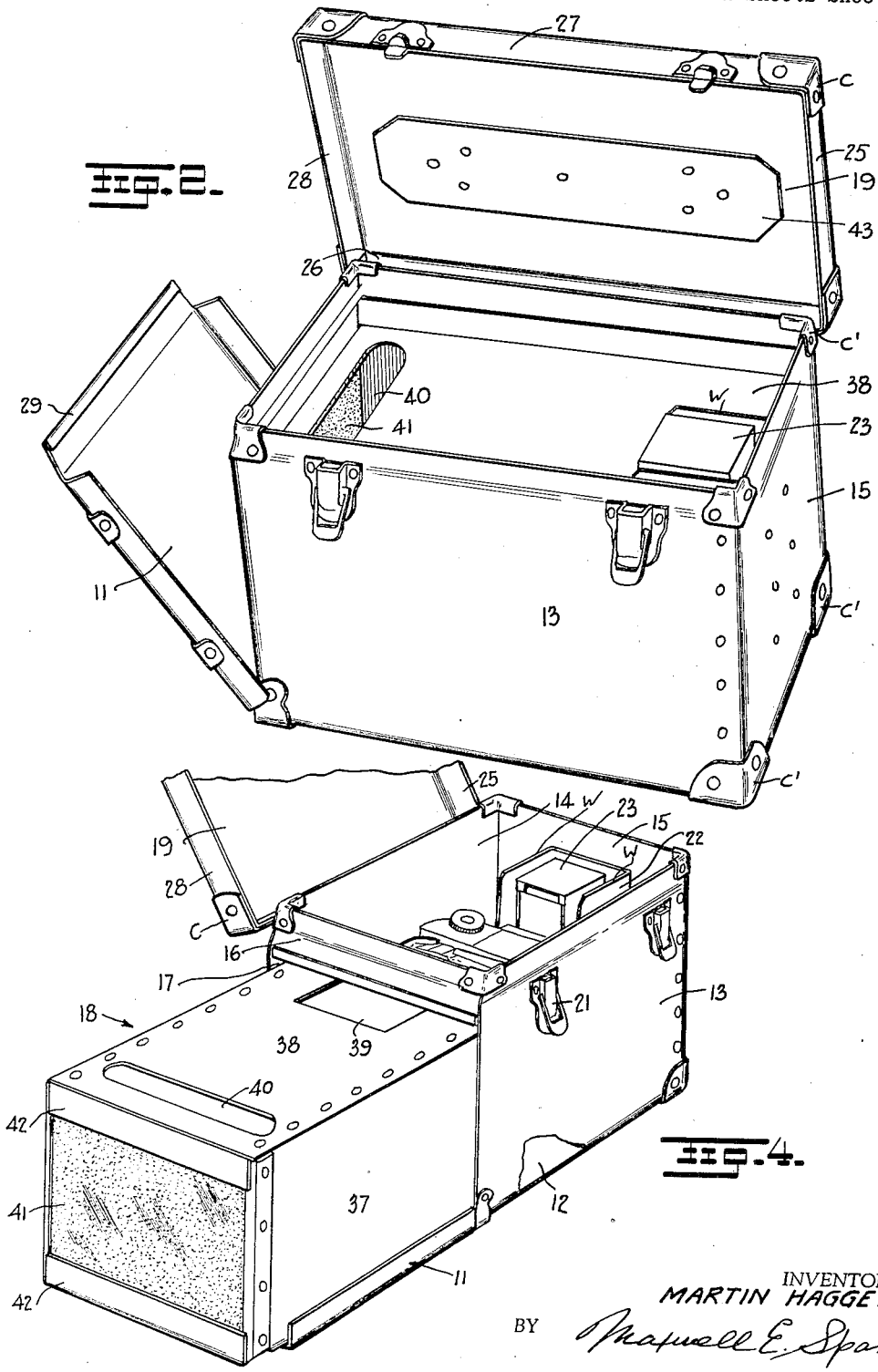
INVENTOR.
MARTIN HAGGETT
BY Maxwell E. Sparrow
ATTORNEY.

Patented Dec. 30, 1941

2,268,450

UNITED STATES PATENT OFFICE 2,268,450

CARRYING CASE FOR PROJECTORS AND PROJECTION SCREENS

Martin Haggett, New York, N. Y.

Application September 14, 1939, Serial No. 294,877

6 Claims. (Cl. 88—24)

This invention relates to carrying case for projector and projection screen and has as a general object the provision of a practical economical and efficient portable device of this nature.

A further object of the present invention resides in the provision of a box or case suitable for carrying a projector and screen from place to place, the screen being telescopically arranged relative to the casing.

Another object of the present invention resides in providing means for enabling the proper focusing of the image upon the screen from the projector. The focusing is done with the housing by moving it towards or away from the projector, thereby permitting the projector lens to remain fixed.

A still further object of the present invention resides in providing a projector carrying case with a telescopic and removable extension housing having at its extreme outer end a screen for receiving the images from the projector. An advantage of having the housing removable is that the projector may be employed for projection of the image upon a conventional screen, if desired.

Yet another object of the present invention resides in providing the aforesaid case with a pocket for supporting the projector, and another object in providing a wall of said housing or extension with a cut-out at its end adjacent the projector to clear the latter when the extension is telescoped.

Another object of the invention is to provide the projector case with a swingable end wall adjacent the telescopicatable screen housing to enable supporting the said housing in extended position, as for example, when the case is placed at the edge of a desk or table.

The invention in one of its aspects generally comprises as an article of manufacture a portable carrying case for projector and projection screen in which the case has an opening at one of its sides through which telescopically fits for extension and retraction a box like extension, the extension being open at one end and carrying a projection screen at its opposite end, provision being made within the case for supporting a projector in substantial alinement with the extension, opening and screen. The extension is provided with a sight opening through which the operator may view the projection upon the screen and may have an appropriate cut-out or cut-outs to accommodate part of the projector or support therefor when the extension is fully retracted within the case. A swingable member is provided at the case opening constituting a side for the case and a cover for the screen.

The above and other objects and advantages are attained by the following disclosure; and this invention accordingly consists in the features of construction, combination of parts and in the unique relations of the members and in the relative proportioning and disposition thereof; all as more completely outlined herein.

To enable others skilled in the art so fully to comprehend the underlying features thereof that they may embody the same by the numerous modifications in structure and relation contemplated by this invention, drawings particularly depicting a certain form of the invention have been annexed as a part of this disclosure, and in such drawings, like characters of reference denote corresponding parts throughout all the views, of which:

Fig. 1 is a perspective view of a device made in accordance with the invention, shown in closed or inoperative position;

Fig. 2 is a similar view to that shown in Fig. 1, showing the cover in raised position and the drop end in partially opened position;

Fig. 3 is another perspective view of the device shown on a reduced scale;

Fig. 4 is a perspective view of the device shown in inoperative position, the cover being broken away; and Fig. 5 is a sectional view taken along line 5—5 of Fig. 4.

Referring now to the drawings the case or cabinet 10 other than the hinged drop end 11, is preferably made of a single blank of suitable material, such as, fibre board, cardboard, etc., foldable to provide the bottom 12, front and rear walls 13, 14, respectively, end wall 15, and end wall 16. End wall 16 is cut out to provide the opening 17 for telescopically receiving the screen housing 18. A cover 19 having a suitable handle 20 is hingedly secured adjacent an upper edge of rear wall 14 and may be locked by means of suitable conventional snap locks 21.

Attached preferably to wall 15 is a support 22 for a conventional projector 23, and which may be substantially box-shaped. Cover 19 has the flanges 25, 26, 27, 28. Flange 28 is employed for engaging the upper edge 29 of the auxiliary end 11 and locking the same securely when the cabinet is in inoperative position as shown in Fig. 1. Metal members C may be provided for reinforcing and securing the corners of the flanges 25—28, and other metal corners C' are provided for the same purpose with respect to the box body walls 13—16.

Screen housing 18 comprises a box-like structure having a bottom 35, side walls 36, 37 secured thereto and a top wall 38. Top wall 38 is provided with a cut-out 39 to clear the projector unit 23 or accommodate the side walls W of support 22 when the unit is in its collapsed position within the housing 18 in its retracted position as shown in Figs. 2 and 3. An opening 40 is provided in the upper wall 38 of housing 18 acting as a sight opening to enable the operator to focus the projector without requiring stepping in front of the projector.

A suitable projection screen 41 is secured by the flanges 42 at the extreme outer end of the housing 18. A reinforcing strap 43 may be provided on the inside of cover 19 for the handle 20.

It can be readily seen that a very efficient, practical, simple and economical device is herein provided for the purpose intended. From Fig. 1 it can be observed that the projector casing is very compact for carrying purposes. To use the device as a projector, the cover is raised and the housing 18 extended to such extent as to obtain a clear image of the object projected by the projector 23. The sight opening 40 facilitates this adjustment of the housing 18 and the focus of the projecting image.

The device provides a combined projector-carrying case and projection screen.

From the foregoing description taken in connection with the accompanying drawings, it is apparent that an improved simple, practical and inexpensive device for the purpose intended is provided. It is apparent, however, that immaterial changes and modifications may be made by skilled persons without departing from the true spirit and scope of the invention as outlined in the appended claims. Hence, the interpretation of said claims should not be based on the present specific disclosure but rather on the pertinent prior art.

Having thus described the invention, what is claimed as new and desired to secure by Letters Patent, is:

1. An article of manufacture comprising a portable case for projector and projection screen, said case having an opening at one of its sides, a box-like extension telescopically fitting said case and arranged to be extended and retracted through said opening, a projection screen carried by said extension at one end, said extension being open at its other end and adapted to cover when in full retracted position the front part of a projector placed within said case, a top for said case, and a swingable door for said case opening constituting a side of said case and provided with a flap engageable with said top when closed for maintaining said door in closed position.

2. An article of manufacture comprising a portable case for projector and projection screen, said case having an opening at one of its sides, a box-like extension telescopically fitting said case and arranged to be extended and retracted through said opening, a projection screen carried by said extension at one end, said extension being open at its other end and adapted to cover when in full retracted position the front part of a projector placed within said case, a top for said case, and a swingable door for said case opening constituting a side of said case and provided with a flap engageable with said top when closed for maintaining said door in closed position, said door when in open position providing a shelf to facilitate support of said extension when extended.

3. An article of manufacture comprising a portable case for projector and projection screen, said case having an opening at one of its sides, a box-like extension telescopically fitting said case and arranged to be extended and retracted through said opening, said extension being open at one end, means within said case for supporting a projector in substantial alinement with said latter open end, and a projection screen carried by said extension at an end opposite its open end, said extension having a top wall provided with a sight opening through which the operator of the projector may view the projection upon said screen.

4. An article of manufacture comprising a portable case for projector and projection screen, said case having an opening at one of its sides, a box-like extension telescopically fitting said case and arranged to be extended and retracted through said opening, said extension being open at one end, means within said case for supporting a projector in substantial alinement with said latter open end, and a projection screen carried by said extension at an end opposite its open end, said extension having a top wall provided with a sight opening through which the operator of the projector may view the projection upon said screen, said top wall being further provided with a cut-out adjacent the open end of said extension for accommodating a part of the projector when the extension is in retracted position.

5. An article of manufacture comprising a portable case for projector and projection screen, said case having an opening at one of its sides, a box-like extension telescopically fitting said case and arranged to be extended and retracted through said opening, said extension being open at one end, means within said case for supporting a projector in substantial alinement with said latter open end, and a projection screen carried by said extension at an end opposite its open end, said extension having a top wall provided with a sight opening through which the operator of the projector may view the projection upon said screen, said extension being removable and adapted to be wholly contained within said case.

6. An article of manufacture comprising a portable case for projector and projection screen, said case having an opening at one of its sides, a box-like extension telescopically fitting said case and arranged to be extended and retracted through said opening, said extension being open at one end, means within said case for supporting a projector in substantial alinement with said latter open end, and a projection screen carried by said extension at an end opposite its open end, said extension having a top wall provided with a sight opening through which the operator of the projector may view the projection upon said screen, said extension being adapted to be wholly contained within said case.

MARTIN HAGGETT.